US012237611B2

(12) United States Patent
Ikeda et al.

(10) Patent No.: US 12,237,611 B2
(45) Date of Patent: Feb. 25, 2025

(54) CONNECTOR HOUSING AND CONNECTOR-EQUIPPED ELECTRIC WIRE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yoshitaka Ikeda, Mie (JP); Kosuke Sone, Mie (JP); Takahiro Maruyama, Mie (JP); Yasuto Takeda, Mie (JP); Tomoyuki Kondo, Mie (JP); Naomichi Kawashima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 352 days.

(21) Appl. No.: 17/911,826

(22) PCT Filed: Feb. 25, 2021

(86) PCT No.: PCT/JP2021/007009

§ 371 (c)(1),
(2) Date: Sep. 15, 2022

(87) PCT Pub. No.: WO2021/187034

PCT Pub. Date: Sep. 23, 2021

(65) Prior Publication Data

US 2023/0335937 A1 Oct. 19, 2023

(30) Foreign Application Priority Data

Mar. 16, 2020 (JP) ................................ 2020-044952

(51) Int. Cl.
*H01R 13/50* (2006.01)
*H01R 13/52* (2006.01)
*H01R 4/18* (2006.01)

(52) U.S. Cl.
CPC ......... *H01R 13/50* (2013.01); *H01R 13/5205* (2013.01); *H01R 4/184* (2013.01)

(58) Field of Classification Search
None
See application file for complete search history.

(56) References Cited

U.S. PATENT DOCUMENTS

| | | | |
|---|---|---|---|
| 5,489,223 | A | 2/1996 | Faje et al. |
| 9,825,409 | B1 | 11/2017 | Kameyama |
| 2020/0254944 | A1 | 8/2020 | Hashimoto et al. |

FOREIGN PATENT DOCUMENTS

| | | | | |
|---|---|---|---|---|
| CN | 1976129 | A * | 6/2007 | H01R 13/113 |
| DE | 10102137 | A1 | 7/2002 | |

(Continued)

OTHER PUBLICATIONS

International Search Report issued on May 18, 2021 for WO 2021/187034 A1 (4 pages).

*Primary Examiner* — Tho D Ta
(74) *Attorney, Agent, or Firm* — Venjuris, P.C.

(57) ABSTRACT

It is an object of the present disclosure to provide a technique for facilitating the insertion of a sealing member-equipped electric wire into a connector housing. The connector housing includes: a housing main body that is provided with a cavity. The cavity includes a first portion that includes one opening portion of the cavity, a second portion that includes the other opening portion of the cavity, and a third portion that is located between the first portion and the second portion. The first portion has a polygonal horizontal cross section, and the third portion has a circular (Continued)

horizontal cross section that is smaller than the horizontal cross section of the first portion.

3 Claims, 7 Drawing Sheets

(56) References Cited

FOREIGN PATENT DOCUMENTS

| | | |
|---|---|---|
| JP | 2010-040475 A | 2/2010 |
| JP | 2014-044858 A | 3/2014 |

* cited by examiner

CONNECTOR HOUSING AND CONNECTOR-EQUIPPED ELECTRIC WIRE

CROSS REFERENCE TO RELATED APPLICATIONS

This application is a national phase of PCT application No. PCT/JP2021/007009, filed on 25 Feb. 2021, which claims priority from Japanese patent application No. 2020-044952, filed on 16 Mar. 2020, all of which are incorporated herein by reference.

TECHNICAL FIELD

The present disclosure relates to a connector housing and a connector-equipped electric wire.

BACKGROUND

Patent Document 1 discloses a harness component including a connector case, a plurality of connector terminals disposed in the connector case, a plurality of electric wires electrically connected to the plurality of connector terminals, and a sealing member that is disposed in a gap between the connector case and an attachment portion that is formed in a corresponding one of the connector terminals, a solid conductor portion of a corresponding one of the electric wires, or a relay conductor constituted by a conductor that relays electricity between the connector terminal and the electric wire.

PRIOR ART DOCUMENT

Patent Document

Patent Document 1: WO 2019/082941 A1

SUMMARY OF THE INVENTION

Problems to be Solved

There has been a need for ease of insertion of a sealing member-equipped electric wire formed by attaching a sealing member to a terminal-equipped electric wire, into a connector housing in which the sealing member-equipped electric wire is to be inserted.

Accordingly, it is an object of the present disclosure to provide a technique that can facilitate the insertion of a sealing member-equipped electric wire into a connector housing.

Means to Solve the Problem

A connector housing according to the present disclosure is a connector housing including: a housing main body that is provided with a cavity, wherein the cavity includes a first portion that includes one opening portion of the cavity, a second portion that includes the other opening portion of the cavity, and a third portion that is located between the first portion and the second portion, the first portion has a polygonal horizontal cross section, and the third portion has a circular horizontal cross section that is smaller than the horizontal cross section of the first portion.

Effect of the Invention

According to the present disclosure, the sealing member-equipped electric wire can be easily inserted into the connector housing.

DETAILED DESCRIPTION TO EXECUTE THE INVENTION

Figure 1:
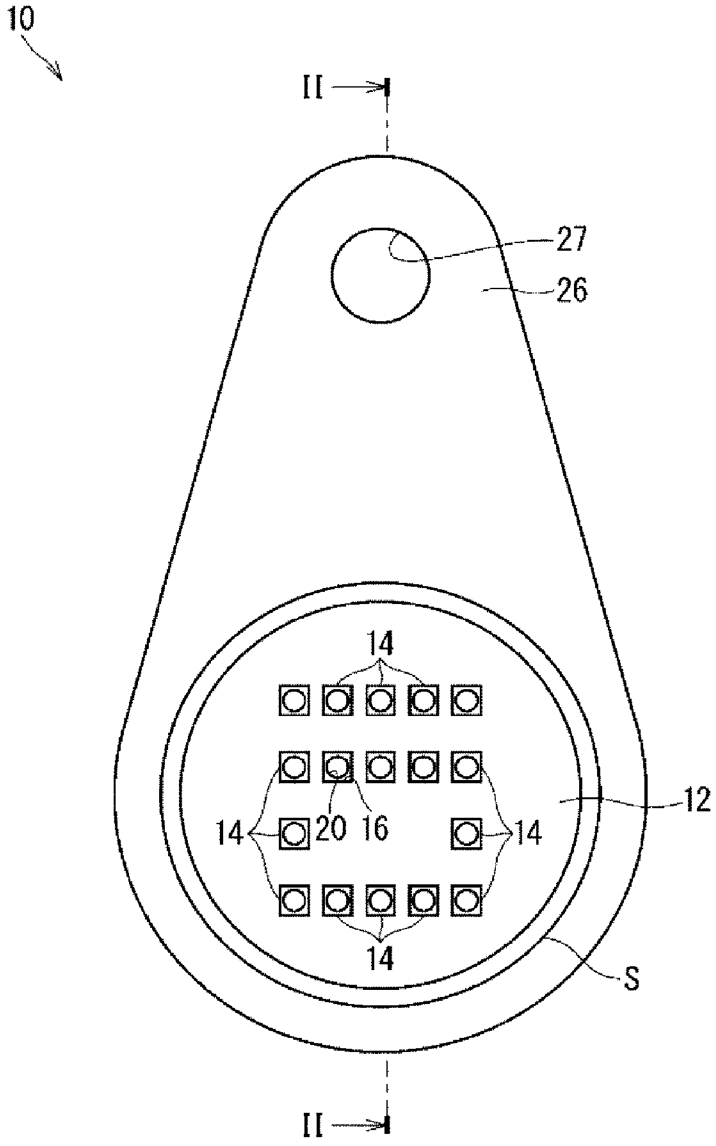
FIG. 1 is a front view of a connector housing according to Embodiment 1.

Description of Embodiment of the Present Disclosure

First, aspects of an embodiment according to the present disclosure will be listed and described.

A connector housing and a connector-equipped electric wire according to the present disclosure are configured as follows.

(1) A connector housing including: a housing main body that is provided with a cavity, wherein the cavity includes a first portion that includes one opening portion of the cavity, a second portion that includes the other opening portion of the cavity, and a third portion that is located between the first portion and the second portion, the first portion has a polygonal horizontal cross section, and the third portion has a circular horizontal cross section that is smaller than the horizontal cross section of the first portion. By providing the first portion, when the sealing member of the sealing member-equipped electric wire is inserted from the first portion to the third portion, a friction force acting between the housing main body and the sealing member is reduced. Also, contact between the housing main body and the terminal component of the sealing member-equipped electric wire in the first portion is suppressed. Accordingly, the sealing member-equipped electric wire can be easily inserted into the connector housing.

(2) In the connector housing according to (1), the cavity may also include a fourth portion that connects the first portion and the third portion, and the fourth portion may include a portion whose horizontal cross section is gradually deformed from the polygonal shape to a circular shape from the first portion side toward the third portion side. With this configuration, the sealing member that is housed in the third portion is unlikely to be caught on the peripheral edge of the opening portion of the third portion.

(3) A connector-equipped electric wire including: the connector housing according to (1) or (2); a terminal-equipped electric wire that is housed in the cavity; and a sealing member that is attached to the terminal-equipped electric wire, wherein the terminal-equipped electric wire includes a coated electric wire and a terminal component, an end of the coated electric wire is housed in the first portion, the terminal component is connected to a conductor core wire of the coated electric wire, a leading end portion of the terminal component is housed in the second portion, and the sealing member is housed in the third portion to prevent a liquid from entering between the first portion and the second portion. By providing the first portion, when the sealing member is inserted from the first portion to the third portion, a friction force acting between the housing main body and the sealing member is reduced. Also, contact between the terminal component and the housing main body in the first portion is suppressed. Accordingly, the sealing member-equipped electric wire can be easily inserted into the connector housing.

Detailed Description of Embodiment of the Present Disclosure

Specific examples of a connector housing and a connector-equipped electric wire according to the present disclosure will be described below with reference to the accompanying drawings. It is to be noted that the present disclosure is not limited to examples given below, the scope of the present disclosure is indicated by the appended claims, and all changes that come within the meaning and range of equivalency of the claims are intended to be embraced within the scope of the present disclosure.

Embodiment 1

Hereinafter, a connector housing and a connector-equipped electric wire according to Embodiment 1 will be described.

Connector Housing

Figure 2:
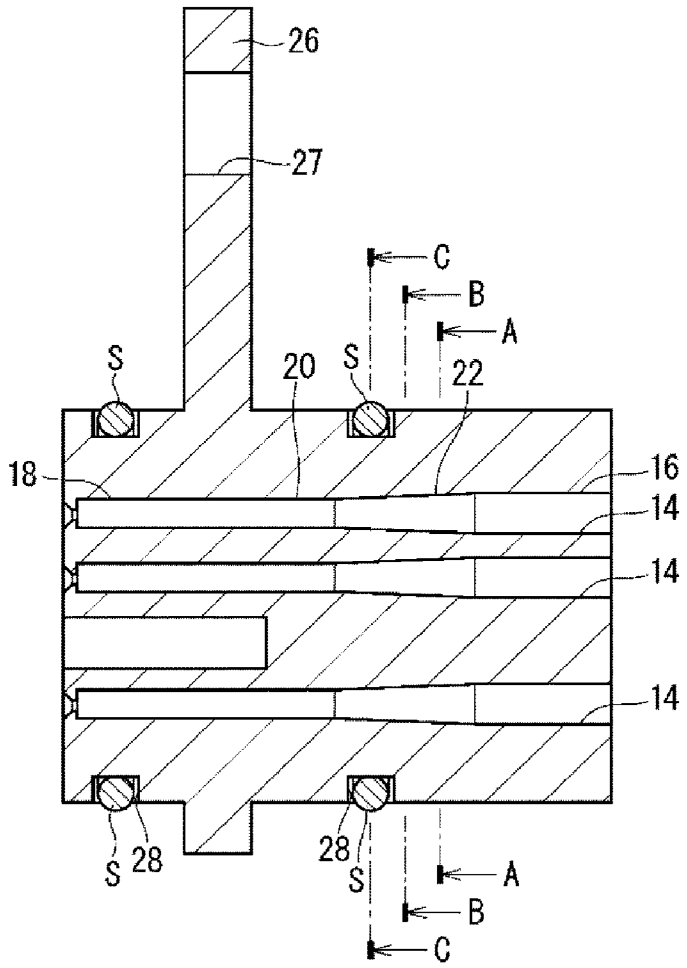
FIG. 2 is a vertical cross-sectional view taken along the II-II line shown in FIG. 1.

First, the connector housing will be described. FIG. 1 is a front view of a connector housing 10 according to Embodiment 1. FIG. 2 is a vertical cross-sectional view taken along the line II-II shown in FIG. 1. In the specification of the present application, a cross section taken along the lengthwise direction of a cavity 14 is defined as a "vertical cross section", and a cross section that is orthogonal to the lengthwise direction of the cavity 14 is defined as a "horizontal cross section".

The connector housing 10 includes a housing main body 12. The housing main body 12 includes a cavity 14. At least one cavity 14 is formed in the housing main body 12. In this example, a plurality of cavities 14 are formed. The plurality of cavities 14 are arranged in an array of a plurality of rows and a plurality of columns. The plurality of cavities 14 may be arranged in an array of one row and a plurality of columns. In FIG. 1, the up-down direction on the paper plane is defined as a "row direction", and the left-right direction on the paper plane is defined as a "column direction". In FIG. 1, the plurality of cavities 14 are arranged uniformly in the row direction and the column direction. However, the plurality of cavities 14 may be arranged such that some of the cavities 14 are shifted in either one of the row direction or the column direction. For example, the plurality of cavities 14 may be arranged such that cavities 14 on odd rows and cavities 14 on even rows are shifted by half the size of a cavity 14 in the column direction. Also, in FIG. 1, the plurality of cavities 14 are arranged such that a few cavities 14 are missing in the row direction and the column direction. Specifically, in FIG. 1, the second cavity 14, the third cavity 14, and the fourth cavity 14 are missing from the third row. The plurality of cavities 14 may be arranged such that there are no missing cavities 14 in the row direction and the column direction.

Each cavity 14 is formed to extend through the housing main body 12. One opening portion of the cavity 14 is open at one end face of the housing main body 12. The other opening portion of the cavity 14 is open at the other end face of the housing main body 12. The cavity 14 includes a first portion 16, a second portion 18, and a third portion 20. In this example, the cavity 14 also includes a fourth portion 22. The fourth portion 22 may be omitted.

The first portion 16 is a portion that includes one opening portion of the cavity 14. The second portion 18 is a portion that includes the other opening portion of the cavity 14. The third portion 20 is a portion that is located between the first portion 16 and the second portion 18. The fourth portion 22 is a portion that connects the first portion 16 and the third portion 20. Accordingly, the first portion 16, the second portion 18, the third portion 20, and the fourth portion 22 are provided in the order of the first portion 16, the fourth portion 22, the third portion 20, and the second portion 18 from the one opening portion of the cavity 14. Hereinafter, the shape of a horizontal cross section of the first portion 16 will be referred to as a "first horizontal cross sectional shape 17". Likewise, the shape of a horizontal cross section of the second portion 18, the shape of a horizontal cross section of the third portion 20, and the shape of a horizontal cross section of the fourth portion 22 will be referred to as a "second horizontal cross sectional shape", a "third horizontal cross sectional shape 21", and a "fourth horizontal cross sectional shape 23", respectively.

Figure 5:
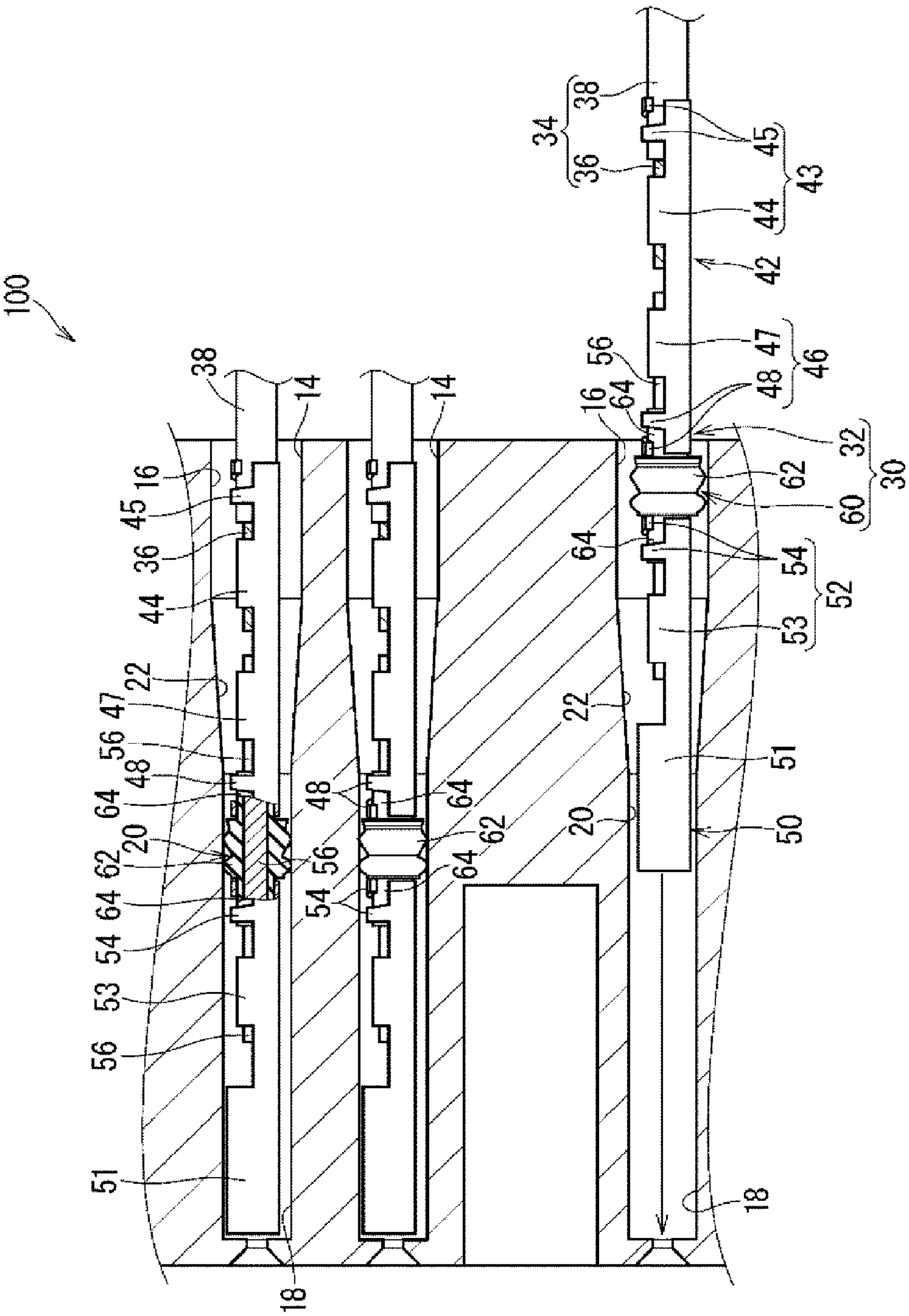
FIG. 5 is a vertical cross-sectional view of a connector-equipped electric wire according to Embodiment 1.
Figure 6:
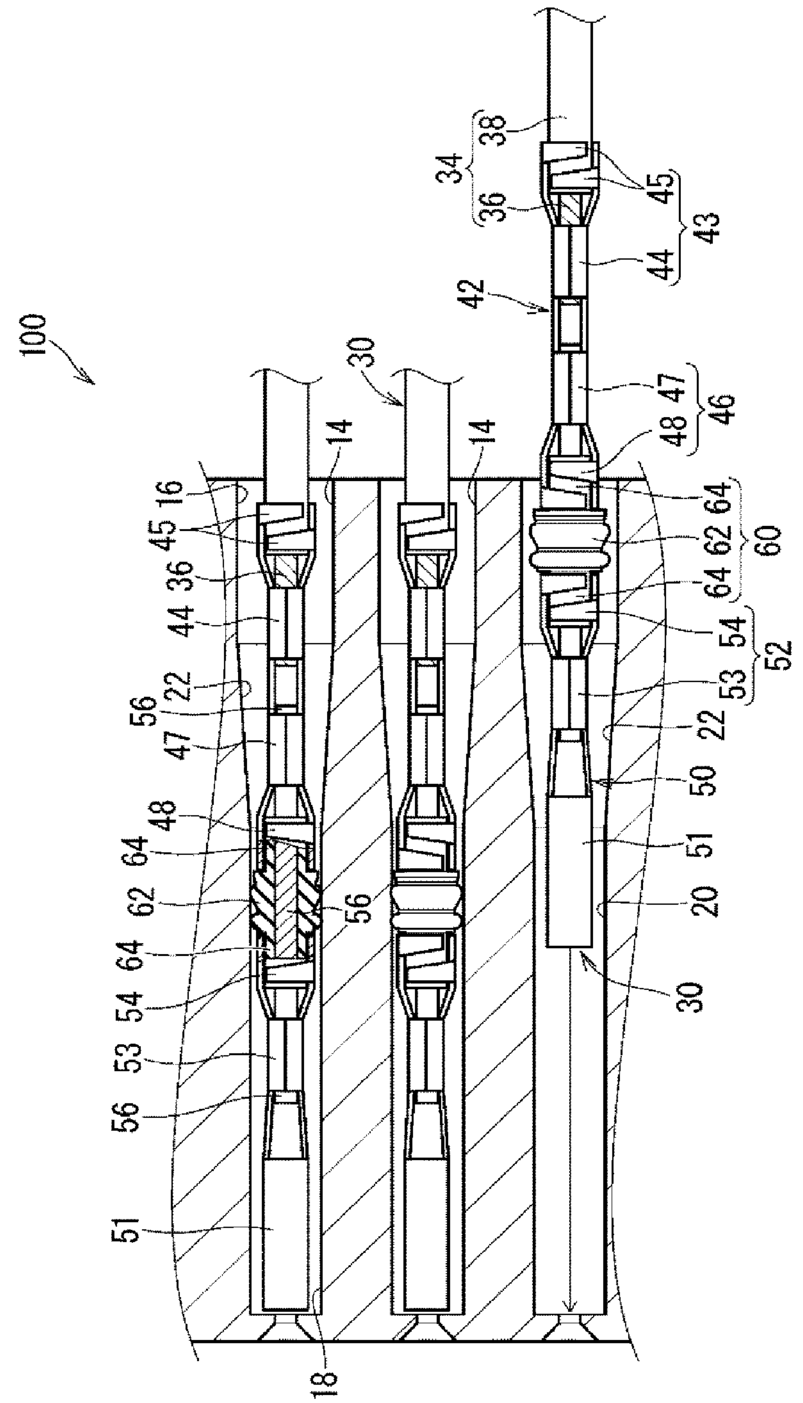
FIG. 6 is a vertical cross-sectional view of the connector-equipped electric wire according to Embodiment 1.

A sealing member-equipped electric wire 30 is inserted into the cavity 14 from the one opening portion of the cavity 14 (see FIGS. 5 and 6). The other opening portion of the cavity 14 is a portion through which a conductor pin attached to a male terminal is passed. This example shows a case where the terminal that is housed in the cavity 14 is a female terminal. In this case, a conductor pin attached to the male terminal of a mating connector is inserted into the cavity 14 through the other opening portion of the cavity 14. In the cavity 14, the female terminal is connected to the conductor pin of the male terminal of the mating connector. Of course, the male terminal may be housed in the cavity 14. In this case, the conductor pin of the male terminal extends through the other opening portion and protrudes to the outside of the cavity 14. Then, the conductor pin of the male terminal protruding to the outside of the cavity 14 is connected to the mating female terminal. The other opening portion of the cavity 14 is formed to be larger than the conductor pin but smaller than the female terminal. With this configuration, it is possible to suppress a situation from occurring in which the female terminal housed in the cavity 14 comes loose from the other opening portion of the cavity 14.

In a state in which the sealing member-equipped electric wire 30 is disposed at a predetermined position in the cavity 14, a sealing member 60 is located in the third portion 20 (see FIGS. 5 and 6). That is, the third portion 20 includes a portion where the sealing member 60 is to be disposed. The length of the third portion 20 is set according to the length of the sealing member 60. The length of the third portion 20 is set to be greater than or equal to at least the length of a seal main body 62 of the sealing member 60. The position of the third portion 20 in the cavity 14 is set according to the position of the sealing member 60 of the sealing member-equipped electric wire 30. In the cavity 14, the first portion 16 and the fourth portion 22 are provided on the one opening portion side relative to the third portion 20. Also, the second portion 18 is provided on the other opening portion side relative to the third portion 20.

The length of the cavity 14 may be set such that the entirety of a terminal component can be housed in the cavity 14. By determining the length of the cavity 14, the length of the third portion 20, and the position of the third portion 20, the length of the second portion and the total length of the first portion 16 and the fourth portion 22 are determined. In this example, the total length of the first portion 16 and the fourth portion 22 is set to be greater than or equal to the length of the seal main body 62. There is no particular limitation on the length of the first portion 16 and the length of the fourth portion 22, and the length of the first portion 16 and the length of the fourth portion 22 can be set as appropriate. For example, the first portion 16 and the fourth portion 22 may have the same length. Also, for example, the length of the first portion 16 and the length of the fourth portion 22 may be set such that the first portion 16 is longer or shorter than the fourth portion 22. For example, on the one opening portion side relative to the third portion 20, only one opening portion of the cavity 14 may be defined as the first portion 16, and a portion other than the one opening portion may be defined as the fourth portion. That is, the shape of the cavity 14 may change gradually from the one opening portion toward the third portion 20.

The first horizontal cross sectional shape 17 is a polygonal shape. In the example shown in FIG. 1, the first horizontal cross sectional shape 17 is a quadrangular shape. The first horizontal cross sectional shape 17 may be a shape other than a quadrangular shape. For example, the first horizontal cross sectional shape 17 may be a triangular shape, a pentagonal shape, a hexagonal shape, a heptangular shape, an octagonal shape, or the like. The first horizontal cross sectional shape 17 is a regular polygonal shape (a square shape in this example). The first horizontal cross sectional shape 17 may be a shape other than a regular polygonal shape. For example, the first horizontal cross sectional shape 17 may be a rectangular shape, a rhombic shape, a trapezoidal shape, a parallelogram shape, or the like. In the example shown in FIG. 1, the corners of the polygonal shape that forms the first horizontal cross sectional shape 17 are not rounded, but may be rounded.

The third horizontal cross sectional shape 21 is a circular shape. The third horizontal cross sectional shape 21 is smaller than the first horizontal cross sectional shape 17. As used herein, the expression "the third horizontal cross sectional shape 21 is smaller than the first horizontal cross sectional shape 17" means that the third horizontal cross sectional shape 21 does not extend beyond the first horizontal cross sectional shape 17. That is, as shown in FIG. 1, when the housing main body 12 is viewed from the front from the one opening portion side, the entirety of the third horizontal cross sectional shape 21 that is a circular shape can be seen within the first horizontal cross sectional shape 17 that is a polygonal shape. The circle that forms the third horizontal cross sectional shape 21 is an inscribed circle inscribed in the polygonal shape that forms the first horizontal cross sectional shape 17, or a circle that is not an inscribed circle and is located within the polygonal shape that forms the first horizontal cross sectional shape 17. The term "inscribed circle" used in the specification of the present application has the same definition as that used in mathematics, and refers to a circle inscribed on all sides of a polygonal shape. Accordingly, a circle that is not inscribed on at least one of all of the sides of a polygonal shape is defined as a circle that is not an inscribed circle. Hereinafter, a circle that is not an inscribed circle and is located within the polygonal shape that forms the first horizontal cross sectional shape 17 will be referred to as an "inner circle".

For example, in the case where the first horizontal cross sectional shape 17 is a square shape, the diameter of the circle that forms the third horizontal cross sectional shape 21 is set to be the same as or smaller than the length of one side of the square shape. In the case where the diameter of the circle that forms the third horizontal cross sectional shape 21 is set to be the same as the length of one side of the square shape, the circle that forms the third horizontal cross sectional shape 21 is an inscribed circle. In the case where the diameter of the circle that forms the third horizontal cross sectional shape 21 is set to be smaller than the length of one side of the square, the circle that forms the third horizontal cross sectional shape 21 is an inner circle. Also, for example, in the case where the first horizontal cross sectional shape 17 is a rectangular shape, the diameter of the circle that forms the third horizontal cross sectional shape 21 is set to be less than or equal to the length of a short side of the rectangular shape. In the case where the first horizontal cross sectional shape 17 is a rectangular shape, a circle that forms the third horizontal cross sectional shape 21 is inevitably an inner circle, and cannot be an inscribed circle. As described above, there are cases where, depending on the polygonal shape of the first horizontal cross sectional shape 17, the circle that forms the third horizontal cross sectional shape 21 cannot be an inscribed circle.

The fourth portion 22 includes a portion (hereinafter referred to as "shape changing portion") whose horizontal cross section gradually deforms from a polygonal shape to a circular shape from the first portion 16 side toward the third portion 20 side. The shape changing portion may include a first shape changing portion and a second shape changing portion. The first shape changing portion is a portion where both the shape and the largest length of the fourth horizontal cross sectional shape change. For example, the first shape changing portion is a portion where both the radius of curvature of corners of a rounded polygonal shape and the size of the polygonal shape change. The second shape changing portion is a portion where, of the shape and the largest length of the fourth horizontal cross sectional shape, only the shape changes, and the largest length does not change. For example, the second shape changing portion is a portion where the radius of curvature of corners of the rounded polygonal shape changes, and the size of the polygonal shape does not change.

A portion whose horizontal cross section changes in size while maintaining similarity in shape from the first portion 16 side toward the third portion 20 side (hereinafter referred to as a "size changing portion under similarity state" or simply as a "similarity changing portion") is not encompassed in the shape changing portion. For example, in the case where the third horizontal cross sectional shape 21 is an inscribed circle, the similarity changing portion is not formed in the fourth portion 22. In the case where the third horizontal cross sectional shape 21 is an inner circle, the similarity changing portion may be formed in the fourth portion 22. Accordingly, in the case where the third horizontal cross sectional shape 21 is an inner circle, the fourth portion 22 may include only the shape changing portion, or may include both the shape changing portion and the similarity changing portion.

By providing the fourth portion 22, the sealing member 60 is unlikely to be caught on the peripheral edge of the opening portion of the third portion 20. More specifically, the circle that forms the third horizontal cross sectional shape 21 is sized to be the same as or smaller than the polygonal shape that forms the first horizontal cross sectional shape 17. For this reason, if the first portion 16 and the third portion 20 are directly connected to each other without the fourth portion 22 being interposed therebetween, a vertical plane height difference that is orthogonal to the lengthwise direction of the cavity 14 is formed at the peripheral edge of the opening portion of the third portion 20 (the joint portion between the first portion 16 and the third portion 20). In contrast, in this example, the first portion 16 and the third portion 20 are connected via the fourth portion 22, and thus the occurrence of the vertical plane height difference is suppressed. The fourth portion 22 can also be considered a guide portion for guiding the insertion of the sealing member 60.

How the fourth horizontal cross sectional shape 23 changes is determined according to the presence or absence of the similarity changing portion in the fourth portion 22, the positional relationship between the shape changing portion and the similarity changing portion, and the like. For example, examples of how the fourth horizontal cross sectional shape 23 changes are shown in FIGS. 3 and 4.

Figure 3:
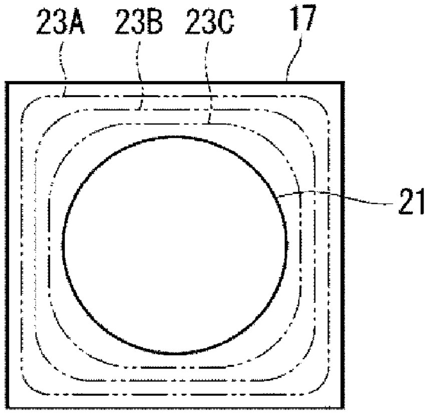
FIG. 3 is a schematic diagram showing an example of a change in the shape of a horizontal cross section of a cavity.
Figure 4:
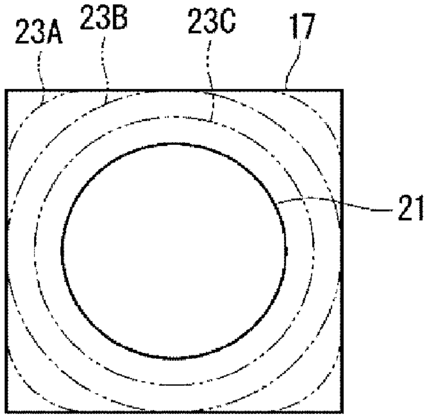
FIG. 4 is a schematic diagram showing another example of a change in the shape of a horizontal cross section of a cavity.

The example shown in FIG. 3 shows a case where the third horizontal cross sectional shape 21 is an inner circle, and the fourth portion 22 does not include the similarity changing portion. FIG. 2 also shows the case where the third horizontal cross sectional shape 21 is an inner circle, and the fourth portion 22 does not include the similarity changing portion. In FIG. 3, fourth horizontal cross sectional shapes 23A, 23B, and 23C indicated by imaginary lines are horizontal cross sections of a cavity 14 taken along the line A-A, the line B-B, and the line C-C shown in FIG. 2, respectively.

In the example shown in FIG. 3, the entire fourth portion 22 in the lengthwise direction corresponds to the first shape changing portion. That is, in the entire region of the shape changing portion, the size of the fourth horizontal cross sectional shape 23 gradually changes from the first portion 16 toward the third portion 20.

More specifically, in the example shown in FIG. 3, in the fourth portion 22, the fourth horizontal cross sectional shape 23 has a rounded polygonal shape at any position in the lengthwise direction of the fourth portion 22, excluding the joint portion between the fourth portion 22 and the first portion 16 and the joint portion between the fourth portion 22 and the third portion 20. The number of corners of the polygonal shape that forms the fourth horizontal cross sectional shape 23 is the same as the number of corners of the polygonal shape that forms the first horizontal cross sectional shape 17. In the shape changing portion, the radius of curvature of corners of the rounded polygonal shape gradually increases from the first portion 16 toward the third portion 20. Also, in the first shape changing portion, the size of the rounded polygonal shape also decreases from the first portion 16 toward the third portion 20. For example, the fourth horizontal cross sectional shape 23A has one square side length shorter than that of the first horizontal cross sectional shape 17, and the corners of the fourth horizontal cross sectional shape 23A are rounded. The fourth horizontal cross sectional shape 23B has one square side length shorter than that of the fourth horizontal cross sectional shape 23A, and the radius of curvature of the corners is larger than that of the fourth horizontal cross sectional shape 23A. The fourth horizontal cross sectional shape 23C has one square side length shorter than that of the fourth horizontal cross sectional shape 23B, and the radius of curvature of the corners is larger than that of the fourth horizontal cross sectional shape 23B. The third horizontal cross sectional shape 21 is a circular shape.

At this time, as shown in FIG. 2, in a vertical cross-sectional view taken along a line that passes through the center of the cavity 14 and parallel to the column direction or the row direction, the shape changing portion may change in shape such that an end opening portion of the first portion 16 on the third portion 20 side and an end opening portion of the third portion 20 on the first portion 16 side can be connected with a straight line.

The first shape changing portion may be provided in a portion of the fourth portion 22 in the lengthwise direction, and the second shape changing portion may be provided in another portion. That is, the size of the fourth horizontal cross sectional shape 23 may gradually change from the first portion 16 toward the third portion 20 only in a partial region of the shape changing portion. There is no particular limitation on the positional relationship between the first shape changing portion and the second shape changing portion, and the positional relationship between the first shape changing portion and the second shape changing portion can be set as appropriate. Of the first shape changing portion and the second shape changing portion, the first shape changing portion may be provided on the first portion 16 side, or the second shape changing portion may be provided on the first portion 16 side.

The example shown in FIG. 4 shows a case where the third horizontal cross sectional shape 21 is a circle that is not an inscribed circle, and the fourth portion 22 includes the similarity changing portion. Note that FIG. 4 does not correspond to the horizontal cross section shown in FIG. 2. A fourth horizontal cross sectional shape 23A indicated by an imaginary line in FIG. 4 is the shape of a horizontal cross section taken along a position corresponding to the line A-A shown in FIG. 2 when the fourth portion 22 has the same length as that of the fourth portion 22 shown in FIG. 2. The same applies to fourth horizontal cross sectional shapes 23B and 23C indicated by imaginary lines in FIG. 4.

In the case where the fourth portion 22 includes the shape changing portion and the similarity changing portion, there is no particular limitation on the positional relationship between the shape changing portion and the similarity changing portion in the fourth portion 22, and the positional relationship between the shape changing portion and the similarity changing portion can be set as appropriate. For example, FIG. 4 shows an example in which the shape changing portion is provided on the first portion 16 side, and the similarity changing portion is provided on the third portion 20 side. Accordingly, the shape of the shape changing portion changes from the polygonal shape to a circular shape from the first portion 16 side toward the third portion 20 side, and the size of the circle of the similarity changing portion decreases. For example, the fourth horizontal cross sectional shape 23A is a square shape that has one side length that is the same as that of the square shape that forms the first horizontal cross sectional shape 17 and whose corners are rounded. The fourth horizontal cross sectional shape 23B is a circular shape that has a diameter that has the same length as one square side length of the fourth horizontal cross sectional shape 23A. The fourth horizontal cross sectional shape 23C is a circular shape that has a diameter smaller than that of the fourth horizontal cross sectional shape 23B. The third horizontal cross sectional shape 21 is a circular shape that has a diameter smaller than that of the fourth horizontal cross sectional shape 23C. A portion extending from the first horizontal cross sectional shape 17 to the fourth horizontal cross sectional shape 23B is defined as the second shape changing portion. A portion extending from the fourth horizontal cross sectional shape 23B to the third horizontal cross sectional shape 21 is defined as the similarity changing portion.

Of course, the shape changing portion may be the first shape changing portion. Also, the shape changing portion may be provided on the third portion 20 side, and the similarity changing portion may be provided on the first portion 16 side. In this case, the size of the polygonal shape that forms the similarity changing portion decreases from the first portion 16 side toward the third portion 20 side, and the shape of the shape changing portion changes from a polygonal shape to a circular shape.

At least one of the shape changing portion and the similarity changing portion may be divided into a plurality of regions along the lengthwise direction of the fourth portion 22. For example, a shape changing portion, a similarity changing portion, and a shape changing portion may be provided from the first portion 16 side toward the third portion 20 side. Alternatively, for example, a similarity changing portion, a shape changing portion, and a similarity changing portion may be provided from the first portion 16 side toward the third portion 20 side.

There is no particular limitation on the second horizontal cross sectional shape, and the second horizontal cross sectional shape may be a circular shape or a polygonal shape. The second horizontal cross sectional shape can be set as appropriate according to the shape of a terminal component 40 or the like. For example, in the example shown in FIG. 2, a guide hole for guiding the male terminal to the cavity 14 is formed in the second portion 18. Alternatively, for example, a lance for holding the terminal component 40 may be formed in the second portion 18.

The connector housing 10 is formed using an insulating material such as a resin. The connector housing 10 is, for example, an injection molded article. In this case, a draft angle may be set in at least one of the first portion 16 and the third portion 20. The draft angle is set such that a metal mold for forming cavities 14 can be easily removed when the connector housing 10 is formed through injection molding. There is no particular limitation on the magnitude of the draft angle, but the draft angle may be set to, for example, be greater than 0° and 5° or less. In the case where the draft angle is set for at least one of the first portion 16 and the third portion 20, the shape changing portion or the similarity changing portion of the fourth portion 22 may include a portion that has a draft angle larger than the draft angle of the at least one of the first portion 16 and the third portion 20.

The connector housing 10 includes a vehicle attaching portion 26. The vehicle attaching portion 26 is provided protruding outward from a lateral side of the housing main body 12. The vehicle attaching portion 26 is a portion for attaching the connector housing 10 to a vehicle. An attachment hole 27 is formed in the vehicle attaching portion 26. The vehicle attaching portion 26 is attached to a vehicle by inserting a bolt or the like into the attachment hole 27. A metal ring or the like may be provided in the attachment hole 27. The vehicle attaching portion 26 may be omitted from the connector housing 10.

The connector housing 10 also includes sealant attachment portions 28. Each sealant attachment portion 28 is formed as a result of a portion of the lateral side of the housing main body 12 being recessed into an annular shape. The sealant attachment portions 28 are provided on opposite sides of the vehicle attaching portion 26. A sealant S such as an O-ring is provided in each of the sealant attachment portions 28. The sealant attachment portions 28 may be omitted from the connector housing 10.

Connector-Equipped Electric Wire

Figure 7:
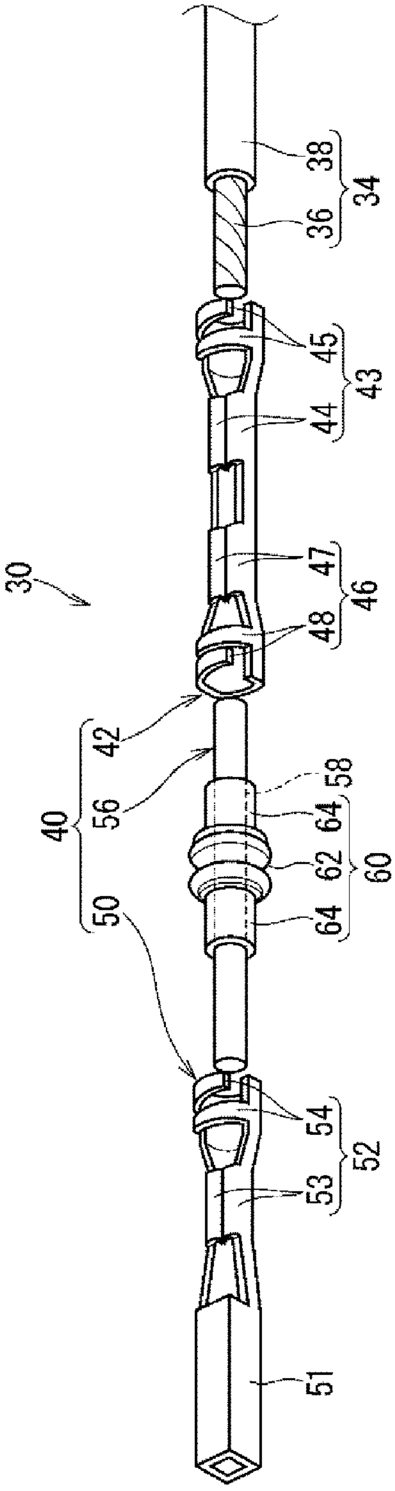
FIG. 7 is an exploded perspective view of a sealing member-equipped electric wire.

A description of the connector-equipped electric wire will be given next. FIGS. 5 and 6 are vertical cross-sectional views of a connector-equipped electric wire 100 according to Embodiment 1. As in FIG. 2, FIG. 5 is a vertical cross-sectional view taken along a line (a line extending in the row direction) parallel to the line II-II shown in FIG. 1. FIG. 6 is a vertical cross-sectional view taken along a line (a line extending in the column direction) orthogonal to the line II-II shown in FIG. 1 on the paper plane of FIG. 1. FIG. 7 is an exploded perspective view of a sealing member-equipped electric wire 30. In FIGS. 5 and 6, only portions of the sealing member-equipped electric wires 30 are shown in the cross sections.

The connector-equipped electric wire 100 includes a connector housing 10 as described above, terminal-equipped electric wires 32, and sealing members 60. Sealing member-equipped electric wires 30 are each formed as a result of a sealing member 60 being attached to a terminal-equipped electric wire 32. Each sealing member-equipped electric wire 30 is housed at a predetermined position in a cavity 14 (hereinafter, this state will be referred to as a "housed state").

The terminal-equipped electric wire 32 is housed in the cavity 14. The terminal-equipped electric wire 32 includes a coated electric wire 34 and a terminal component 40. The terminal component 40 and a portion of the coated electric wire 34 that is connected to the terminal component 40 are housed in the cavity 14. The other end portion of the coated electric wire 34 that is a portion different from the portion of the coated electric wire 34 that is connected to the terminal component 40 extends outward of the cavity 14 from the one opening portion of the cavity 14.

The coated electric wire 34 includes a conductor core wire 36 and an insulation coating 38. In this example, the conductor core wire 36 is a twisted wire. The twisted wire is formed by twisting a plurality of strands together. The strands are made of a conductor such as copper, a copper alloy, aluminum, or an aluminum alloy. The insulation coating 38 covers the conductor core wire 36. The insulation coating 38 is formed as a result of a resin material being extrusion molded onto the conductor core wire 36 or an insulating coating material being applied to the conductor core wire 36. The leading end of the conductor core wire 36 protrudes outward from the insulation coating 38, and forms a core wire exposed portion.

The terminal component 40 includes an electric wire connecting portion 43 that is connected to the coated electric wire 34 and a mating terminal connecting portion 51 that is connected to a mating terminal. In this example, the terminal component 40 is composed of three components including a joint terminal 42, a connector terminal 50, and a relay conductor 56. The electric wire connecting portion 43 is provided in the joint terminal 42. The mating terminal connecting portion 51 is provided in the connector terminal 50. The relay conductor 56 is connected to the joint terminal 42 and the connector terminal 50. The joint terminal 42 and the connector terminal 50 are connected via the relay conductor 56.

The joint terminal 42 includes an electric wire connecting portion 43 and a relay conductor connecting portion 46. In this example, the joint terminal 42 is connected to the coated electric wire 34 and the relay conductor 56 through crimping. The joint terminal 42 is formed by, for example, bending a conductor plate. Of course, the joint terminal 42 may be connected to the coated electric wire 34 or the relay conductor 56 through welding, pressure welding, or the like.

The electric wire connecting portion 43 includes a wire barrel 44 and an insulation barrel 45. The wire barrel 44 is crimped to the core wire exposed portion of the conductor core wire 36 at an end portion of the conductor core wire 36. The insulation barrel 45 is crimped to the insulation coating 38. The wire barrel 44 and the insulation barrel 45 are open barrels. The insulation barrel 45 may be omitted from the electric wire connecting portion 43.

The relay conductor connecting portion 46 includes a wire barrel 47 and an insulation barrel 48. The wire barrel 47 is crimped to the relay conductor 56. The insulation barrel 48 is crimped to the sealing member 60. The wire barrel 47 and the insulation barrel 48 are open barrels. The insulation barrel 48 may be omitted from the relay conductor connecting portion 46.

The connector terminal 50 includes a mating terminal connecting portion 51 and a relay conductor connecting portion 52. As described above, the mating terminal connecting portion 51 is shaped as a female terminal. The mating terminal connecting portion 51 may be shaped as a male terminal. In this example, the connector terminal 50 is connected to the relay conductor 56 through crimping. The connector terminal 50 is formed by, for example bending a conductor plate. Of course, the connector terminal 50 may be connected to the relay conductor 56 through welding, pressure welding, or the like.

The mating terminal connecting portion 51 is formed to have a box shape that has an opening at a front end portion thereof. A male terminal is inserted into the mating terminal connecting portion 51 via the opening. A spring contact portion or the like is provided in the mating terminal connecting portion 51 as appropriate. In the mating terminal connecting portion 51, the spring contact portion or the like is connected to the male terminal.

The relay conductor connecting portion 52 includes a wire barrel 53 and an insulation barrel 54. The wire barrel 53 is crimped to the relay conductor 56. The insulation barrel 54 is crimped to the sealing member 60. The insulation barrel 54 may be omitted from the relay conductor connecting portion 52.

The relay conductor 56 is formed as a single conductor. The relay conductor 56 is a solid cylindrical rod. The relay conductor 56 may be a hollow cylindrical rod. The relay conductor 56 is longer than the sealing member 60. Two opposite end portions of the relay conductor 56 in the lengthwise direction protrude outward from the sealing member 60. The opposite end portions of the relay conductor 56 are crimped to the wire barrels 47 and 53, respectively.

The terminal-equipped electric wire 32 includes an attachment portion 58. The sealing member 60 is attached to the attachment portion 58. The attachment portion 58 has a circular outer surface. In this example, an intermediate portion of the relay conductor 56 in the lengthwise direction is defined as the attachment portion 58.

The sealing member 60 includes a seal main body 62 and a held portion 64. A through hole 66 is formed in the sealing member 60. The relay conductor 56 is passed through the through hole 66. The seal main body 62 and the held portion 64 are provided side by side in the axis direction of the through hole 66. In this example, a held portion 64 is provided on each side of the seal main body 62. The held portion 64 may be provided only on one side of the seal main body 62, or the held portion 64 may be omitted.

The seal main body 62 is a portion that prevents a liquid from entering between the first portion 16 and the second portion 18 while the sealing member-equipped electric wire 30 is inserted into the cavity 14. On the outer surface of the seal main body 62, an annular recessed portion and an annular protruding portion are alternately arranged in the lengthwise direction. The seal main body 62 is provided between the joint terminal 42 and the connector terminal 50 in the lengthwise direction thereof. The annular protruding portions of the seal main body 62 protrude outward of the joint terminal 42 and the connector terminal 50 in the radial direction.

In a state before the sealing member-equipped electric wire 30 is inserted into the cavity 14, the outer diameter of the seal main body 62 is set to be the same as or greater than the inner diameter of the third portion 20 (the diameter of the circle that forms the third horizontal cross sectional shape 21). The longest portion of the first horizontal cross sectional shape 17 has a length larger than the inner diameter of the third portion 20. Accordingly, a friction force acting between the first portion 16 and the sealing member 60 is smaller than a friction acting force between the third portion 20 and the sealing member 60. The longest portion of the first horizontal cross sectional shape 17 (the diagonal line in the case where the first horizontal cross sectional shape 17 is a rectangular shape) may have a length larger than the outer diameter of the seal main body 62. In this case, a friction force acting between the first portion 16 and the sealing member 60 is further reduced. Furthermore, the shortest portion of the first horizontal cross sectional shape 17 (a short side in the case where the first horizontal cross sectional shape 17 is a rectangular shape) may have a length larger than the outer diameter of the seal main body 62. In this case, a friction force acting between the first portion 16 and the sealing member 60 is further reduced.

Specifically, in the case where the first horizontal cross sectional shape 17 is a rectangular shape, the longest portion of the first horizontal cross sectional shape 17 is the diagonal line. When the diagonal line of the first horizontal cross sectional shape 17 has a length larger than the outer diameter of the seal main body 62, a friction force between the corners of the first horizontal cross sectional shape 17 and the sealing member 60 is unlikely to occur, and a friction force acting between the first portion 16 and the sealing member 60 is further reduced. A long side of the first horizontal cross sectional shape 17 may have a length larger than the outer diameter of the seal main body 62. In this case, a friction force between the short side of the first horizontal cross sectional shape 17 and the sealing member 60 is unlikely to occur, and a friction force between the first portion 16 and the sealing member 60 is further reduced. Furthermore, a short side of the first horizontal cross sectional shape 17 may have a length larger than the outer diameter of the seal main body 62. In this case, a friction force between a long side of the first horizontal cross sectional shape 17 and the sealing member 60 is also unlikely to occur, and thus a friction force between the first portion 16 and the sealing member 60 is further reduced.

The held portion 64 are portions that are respectively crimped to the insulation barrels 48 and 54, with the held portions 64 being attached to the relay conductor 56. With this configuration, the held portions 64 are positioned and held by the connector terminal 50 and the joint terminal 42, and the sealing member 60 is positioned and held by the terminal-equipped electric wire 32. In the case where the held portions 64 are omitted, the attachment portion 58 may be shaped such that the sealing member 60 can be positioned and held. For example, a groove may be formed in the attachment portion 58. The sealing member 60 can be positioned and held by the attachment portion 58 as a result of the sealing member 60 being fitted into the groove.

When the sealing member-equipped electric wire 30 is in the housed state, an end of the coated electric wire 34 is housed in the first portion 16. Also, a leading end portion of the terminal component 40 (in this example, the mating terminal connecting portion 51 of the connector terminal 50) is housed in the second portion 18. Also, the sealing member 60 is housed in the third portion 20. As a result of the sealing member 60 being provided, a liquid/water is prevented from entering between the first portion 16 and the second portion 18. The liquid that is prevented from entering between the first portion 16 and the second portion 18 by the sealing member 60 may be water, oil, or the like. The oil is, for example, oil (working oil) for performing an automatic transmission control operation in an automatic transmission. The entrance of a liquid between the first portion 16 and the second portion 18 is prevented, for example, in the manner described below.

The inside of the attachment portion 58 is solid. With this configuration, it is possible to suppress a situation from occurring in which a liquid that flows through the inside of the attachment portion 58 permeates into one of the first portion 16 and the second portion 18 from the other one of the first portion 16 and the second portion 18. The inside of the attachment portion 58 may be hollow. In this case as well, as long as at least one end portion of the attachment portion 58 in the lengthwise direction is closed, it is possible to suppress a situation from occurring in which a liquid that flows through the inside of the attachment portion 58 permeates into one of the first portion 16 and the second portion 18 from the other one of the first portion 16 and the second portion 18.

The inner surface of the seal main body 62 (the inner circumferential surface of the through hole 66) has a circular shape. When the sealing member-equipped electric wire 30 is in the housed state, the inner surface of the seal main body 62 is in close contact with the entire outer surface of the attachment portion 58 in the circumferential direction. As a result of the seal main body 62 being configured as described above, it is possible to suppress a situation from occurring in which a liquid that flows between the seal main body 62 and the attachment portion 58 permeates into one of the first portion 16 and the second portion 18 from the other one of the first portion 16 and the second portion 18. It is sufficient that the entire inner surface of at least a portion of the seal main body 62 in the lengthwise direction is in close contact with the outer surface of the attachment portion 58. The inner surface of the seal main body 62 may be smaller than the outer surface of the attachment portion 58 in a state before the sealing member 60 is attached to the attachment portion 58. The inner surface of the seal main body 62 may be pressed against the outer surface of the attachment portion 58 in response to being subjected to pressure from the cavity 14 when the sealing member-equipped electric wire 30 is housed.

The outer surface of the seal main body 62 has a circular shape. When the sealing member-equipped electric wire 30 is in the housed state, the outer surface of the annular protruding portions of the seal main body 62 is in close contact with the entire inner surface of the third portion 20 in the cavity 14. With this configuration, it is possible to suppress a situation from occurring in which a liquid that flows between the seal main body 62 and the connector housing 10 permeates into one of the first portion 16 and the second portion 18 from the other one of the first portion 16 and the second portion 18.

With the connector housing 10 configured as described above and the connector-equipped electric wire 100 including the connector housing 10, by providing the first portion 16, when the sealing member 60 of the sealing member-equipped electric wire 30 is inserted from the first portion 16 to the third portion 20, a friction force between the housing main body 12 and the sealing member 60 in the first portion 16 is reduced. For this reason, the distance over which the sealing member 60 moves under a large friction force can be reduced. Also, contact between the housing main body 12 and the terminal component 40 of the sealing member-equipped electric wire 30 in the first portion 16 is suppressed. Accordingly, the sealing member-equipped electric wire 30 can be easily inserted into the connector housing 10.

Also, by providing the fourth portion 22, the sealing member 60 that is housed in the third portion 20 is unlikely to be caught on the peripheral edge of the opening portion of the third portion 20. With this configuration as well, the sealing member-equipped electric wire 30 can be easily inserted into the connector housing 10.

Variations

Figure 8:
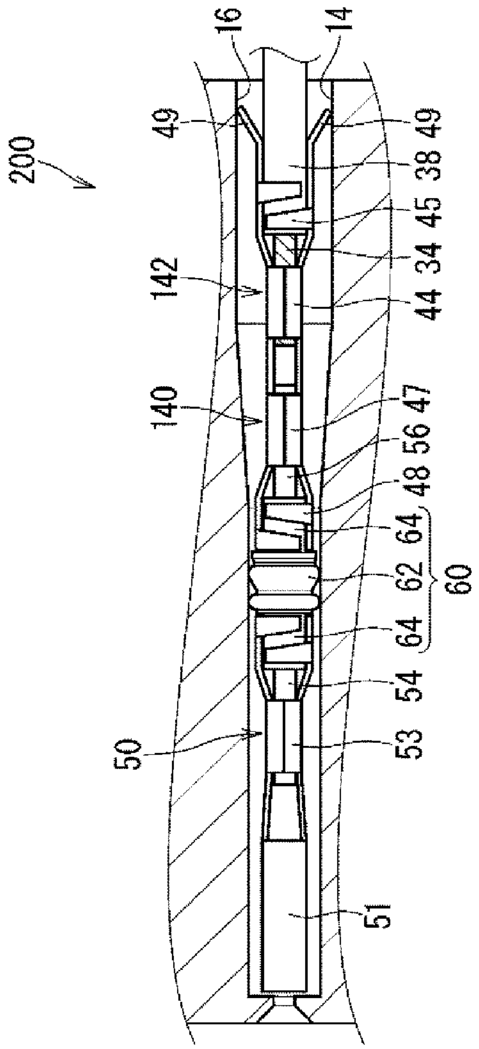
FIG. 8 is a vertical cross-sectional view of a connector-equipped electric wire according to a variation.

FIG. 8 is a vertical cross-sectional view showing a variation of the connector-equipped electric wire 100. A connector-equipped electric wire 200 according to a variation shown in FIG. 8 is different from the connector-equipped electric wire 100 in that a terminal component 140 has a shape different from that of the terminal component 40 described above. Specifically, a raised portion 49 is provided in a joint terminal 142 of the terminal component 140. The connector-equipped electric wire 200 has the same configuration as that of the connector-equipped electric wire 100, except that the raised portion 49 is provided in the connector-equipped electric wire 200. Structural elements that are the same as those described above are given the same reference numerals, and a description thereof will be omitted.

The raised portion 49 is configured to come into contact with the inner circumferential surface of the cavity 14 when the sealing member-equipped electric wire 30 is housed. The raised portion 49 comes into contact with the inner circumferential surface of the cavity 14 to support the joint terminal 142. The raised portion 49 is formed to protrude outward in the radial direction relative to the barrels 44 and 45. In FIG. 8, the raised portion 49 is formed at such a position that the raised portion 49 comes into contact with the inner surface of the first portion 16. The raised portion 49 may be formed at such a position that the raised portion 49 comes into contact with the inner surface of the fourth portion 22. In FIG. 8, the raised portion 49 is provided on the rear end side relative to the insulation barrel 45. The position of the raised portion 49 in the joint terminal 142 is not limited to that described above, and can be set as appropriate. In FIG. 8, raised portions 49 are provided to protrude on two lateral sides of the joint terminal 142. The raised portion 49 may be provided to protrude downward of the joint terminal 142. Raised portions 49 may be provided to protrude in three directions including on two lateral sides and downward of the joint terminal 142. The raised portion 49 may be formed to protrude outward in the radial direction relative to the seal main body 62. The raised portion may also be formed by folding a conductor plate, as with the barrels 44 and 45.

When the sealing member-equipped electric wire 30 is in the housed state, the raised portion 49 may be elastically deformed and flattened in the radial direction in response to being subjected to a force from the inner surface of the cavity 14. For example, the raised portion 49 may be configured as a spring such as a plate spring and may be elastically deformed and flattened in the radial direction of the cavity 14. Also, in a state before the sealing member-equipped electric wire 30 is housed in the cavity 14, the raised portion 49 is formed to be larger than the portion of the cavity 14 that comes into contact with the raised portion 49. In this case, as shown in FIG. 8, the raised portion 49 may be formed to gradually protrude outward in the radial direction toward the rear end side. With this configuration, the raised portion 49 is easily deformed and flattened in response to being subjected to a force from the inner surface of the cavity 14 when the sealing member-equipped electric wire 30 is housed in the cavity 14.

Up to here, an example has been described in which the terminal component 40 is composed of three components including the joint terminal 42 (142), the connector terminal 50, and the relay conductor 56, but this configuration is not essential. Either one or both of the joint terminal 42 (142) and the relay conductor 56 may be omitted. In the case where either one or both of the joint terminal 42 (142) and the relay conductor 56 are omitted, the electric wire connecting portion 43 is provided in the remaining terminal component. Also, the attachment portion 58 is provided in the remaining terminal component or conductor core wire.

More specifically, in the case where both of the joint terminal 42 (142) and the relay conductor 56 are omitted, the electric wire connecting portion is provided in the connector terminal. The attachment portion may be provided in the connector terminal or the conductor core wire. In the case where the attachment portion is provided in the connector terminal, the attachment portion may be formed to have an annular shape such as a closed barrel, with a portion of the attachment portion that is on the mating terminal connecting portion side being closed. In the case where the attachment portion is provided on the conductor core wire, the conductor core wire may be a single core wire composed of a single conductor, and the sealing member may be attached to the conductor core wire such that the seal main body is provided between the insulation coating and the connector terminal.

In the case where either one of the joint terminal 42 (142) and the relay conductor 56 is omitted, the functions of one of the joint terminal 42 (142) and the relay conductor 56 are integrated with the other one of the joint terminal 42 (142) and the relay conductor 56. For example, the functions of the joint terminal may be integrated with the relay conductor. In this case, the electric wire connecting portion is provided in the relay conductor.

The structural elements described in the embodiment and the variations given above can be combined unless they are technically contradictory to each other.

LIST OF REFERENCE NUMERALS

10 Connector housing
12 Housing main body
14 Cavity
16 First portion
17 First horizontal cross sectional shape
18 Second portion
20 Third portion
21 Third horizontal cross sectional shape
22 Fourth portion
23, 23A, 23B, 23C Fourth horizontal cross sectional shape
26 Vehicle attaching portion
27 Attachment hole
28 Sealant attachment portion
30 Sealing member-equipped electric wire
32 Terminal-equipped electric wire
34 Coated electric wire
36 Conductor core wire
38 Insulation coating
40, 140 Terminal component
42, 142 Joint terminal
43 Electric wire connecting portion
44, 47, 53 Wire barrel
45, 48, 54 Insulation barrel
46, 52 Relay conductor connecting portion
49 Raised portion
50 Connector terminal
51 Mating terminal connecting portion
56 Relay conductor
58 Attachment portion
60 Sealing member
62 Seal main body
64 Held portion
66 Through hole
100, 200 Connector-equipped electric wire
S Sealant

What is claimed is:

1. A connector housing comprising:
a housing main body that is provided with a cavity,
wherein the cavity includes a first portion that includes one opening portion of the cavity, a second portion that includes the other opening portion of the cavity, and a third portion that is located between the first portion and the second portion,
the first portion has a polygonal horizontal cross section, and
the third portion has a circular horizontal cross section that is smaller than the horizontal cross section of the first portion.

2. The connector housing according to claim 1,
wherein the cavity also includes a fourth portion that connects the first portion and the third portion, and
the fourth portion includes a portion whose horizontal cross section is gradually deformed from a polygonal shape to a circular shape from the first portion side toward the third portion side.

3. A connector-equipped electric wire comprising:
the connector housing according to claim 1;
a terminal-equipped electric wire that is housed in the cavity; and
a sealing member that is attached to the terminal-equipped electric wire,
wherein the terminal-equipped electric wire includes a coated electric wire and a terminal component,
an end of the coated electric wire is housed in the first portion,
the terminal component is connected to a conductor core wire of the coated electric wire,
a leading end portion of the terminal component is housed in the second portion, and
the sealing member is housed in the third portion to prevent a liquid from entering between the first portion and the second portion.

* * * * *